United States Patent [19]

Matsuzawa

[11] Patent Number: 4,916,802
[45] Date of Patent: Apr. 17, 1990

[54] METHOD FOR PRODUCING A MAGNETIC HEAD CORE

[75] Inventor: Soichiro Matsuzawa, Kuwana, Japan

[73] Assignee: NGK Insulators, Ltd., Japan

[21] Appl. No.: 262,088

[22] Filed: Oct. 26, 1988

Related U.S. Application Data

[63] Continuation of Ser. No. 683,492, Feb. 19, 1984, abandoned.

[30] Foreign Application Priority Data

Dec. 27, 1983 [JP] Japan ................. 58-246261

[51] Int. Cl.$^4$ .............................. G11B 5/42
[52] U.S. Cl. ..................... 29/603; 360/121; 360/127
[58] Field of Search ............. 29/603; 360/119–121, 360/127

[56] References Cited

U.S. PATENT DOCUMENTS

| | | | |
|---|---|---|---|
| 3,605,258 | 9/1971 | Fisher et al. | 29/603 |
| 3,672,045 | 6/1972 | Robertson | 29/603 |
| 3,751,803 | 8/1973 | Fisher et al. | 29/603 |
| 3,819,348 | 6/1974 | Murray | 29/603 X |
| 4,040,174 | 8/1977 | Tsuda | 29/603 |
| 4,249,301 | 2/1981 | Cartwright | 29/603 |
| 4,729,161 | 3/1988 | Verbunt et al. | 29/603 |

FOREIGN PATENT DOCUMENTS

| | | |
|---|---|---|
| 53-32692 | 9/1978 | Japan . |
| 0038687 | 3/1980 | Japan ................. 29/603 |

OTHER PUBLICATIONS

Japanese Patent Abstract 59—29823, vol. 5, No. 84 (P—64), Jun. 2, 1981.
Japanese Patent Abstract 57—18011, vol. 6, No. 82 (P—116), May 20, 1982.
Japanese Patent Abstract 53—42560, vol. 3, No. 155 (E—160), Dec. 19, 1979.
IBM Technical Disclosure Bulletin, vol. 21, No. 6, Nov. 1978.
Japanese Patent Abstract 57—120220, vol 6, No. 217 (P—152), Oct. 30, 1982.

Primary Examiner—Carl E. Hall
Attorney, Agent, or Firm—Arnold, White & Durkee

[57] ABSTRACT

A magnetic head core consisting of a plurality of core elements of ferrite which are butted and bonded together into a generally ring-shaped structure by means of a solid-solid reaction at the abutting surfaces. A magnetic gap is defined by opposed surfaces of the two core element, at one end of the core. In producing the core from a pair of core elements, at least one of the core elements is subjected to grinding or chemical etching to remove stock to form the magnetic gap when the elements are assembled, and a groove is formed in at least one of the core elements. The two core elements are then butted together with the groove located internally to form a coil-winding aperture between the two elements, and such that the opposed surfaces of the elements define the magnetic gap. The butted core elements are then heated to bond them at the abutting surfaces by means of a solid-solid reaction.

6 Claims, 8 Drawing Sheets

METHOD FOR PRODUCING A MAGNETIC HEAD CORE

This is a continuation of application Ser. No. 06/683,492 filed Dec. 19, 1984, now abandoned.

BACKGROUND OF THE INVENTION

The present invention relates generally to a core of a magnetic head and a method of producing such a magnetic head core, and more particularly to a magnetic head core made of ferrite with a magnetic gap formed between core elements, and having substantially no rear or back gap opposite to the magnetic gap, ad to a method of manufacturing the same.

In the art of magnetic heads for various types of recording media, a core made of ferrite has been known, which generally consists of a pair of ferrite core elements joined together to form a structure of a ring-shaped or a toric cross section having a centrally located large aperture or void which facilitates winding of coils around the core elements. More specifically, referring to FIG. 1, which shows a common type of magnetic head core, a pair of generally C-shaped ferrite core halves 2, 4 are butted together to form the core with a central aperture 6 which serves as a space for winding coils 8 around the core halves 2, 4. In this manner, an annular or toric magnetic circuit is constituted by the two C-shaped ferrite core halves 2, 4. Additionally, the toric magnetic core structure is formed with a magnetic gap 10 at one end portion of the core. The gap 10 is formed to extend across the toric magnetic circuit and has a suitable width $\alpha$ which is the distance between the opposed end surfaces of the core halves 2, 4. As is well known in the art, a magnetic tape 12, magnetic disk or other magnetic recording medium, is slidably moved on outer contact surfaces of the core halves 2, 4 in the proximity of the gap 10 defined by these halves 2, 4, whereby magnetic writing (recording) and reading (reproducing) processes are effected.

Figure 1:
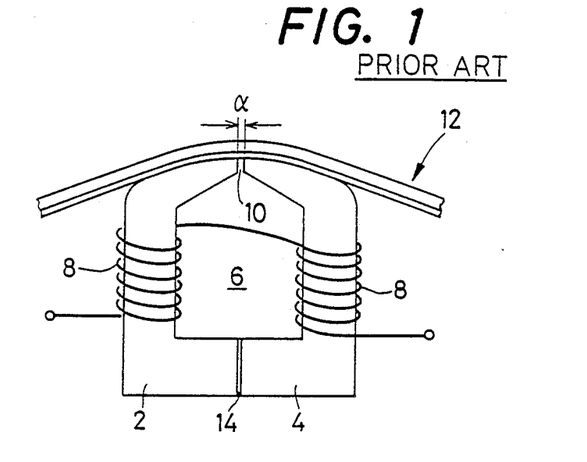
FIG. 1 is an illustration of a magnetic head arrangement known in the prior art.

As indicated above, the ends of the core halves 2, 4 at one end of the core have the opposed surfaces which are spaced apart from each other by a distance equal to the width $\alpha$ of the magnetic gap, while the other ends of the core halves 2, 4 are bonded together with suitable bonding glass so as to maintain a generally toric cross sectional shape of the magnetic core as a whole. In this known ferrite core formed of the two core elements 2, 4 bonded together with glass, however, it is inevitable that a very small gap 14, a so called rear gap or back gap, is formed between the bonded abutting surfaces of the core elements 2, 4. The existence of this rear gap 14, which is located opposite to the magnetic air gap 10 at the front of the core, necessarily increases the magnetic resistance of the magnetic circuit, and consequently has an adverse effect on the sensitivity, and signal to noise ratio (S/N ratio) of a magnetic head using the core, which sensitivity and S/N ratio are important characteristics of the magnetic head. In other words, it is required to completely eliminate the rear gap 14, i.e., to reduce the width of the gap to zero in order to maximize the sensitivity of the magnetic head, and accordingly improve the S/N ratio. However, this requirement has not been satisfied by any traditional ferrite core formed from a plurality of core members or elements as described above.

While the above-described type of ferrite core for a magnetic head is constructed of two core elements which are joined together to form a toric or a ring-shaped structure, an alternative method of producing such a ferrite core is known, which comprises press-molding an integral toroidal or ring-shaped body of ferrite and forming a magnetic gap of a suitable size in the molded ferrite body. In this alternative method, wherein the magnetic gap is formed in the toroidal molding of ferrite in a suitable mechanical process, the width $\alpha$ of the magnetic gap is necessarily greater than a certain limit. For example, when the magnetic gap is formed by sawing the molded ferrite body with a diamond cutter, the minimum possible width of the gap is about 0.3 mm, which is relatively large and only suitable for an erasing head.

On the contrary, the cores of magnetic heads for VTR and computer applications are required to have a comparatively small or narrow magnetic gap, the width $\alpha$ thereof ranging from 0.4 to 3 microns, approximately, for improved magnetic characteristics. However, a molded integral ferrite core with such a small magnetic gap width has not yet been obtained in this field of technology. Stated differently, the failure or incapability to provide a molded ferrite core with such a small magnetic gap (0.4–3 microns) has necessitated the use of a pair of ferrite core elements, as previously indicated, to produce a magnetic core for a magnetic disk, for example, which requires a very small magnetic gap.

SUMMARY OF THE INVENTION

It is accordingly an object of the present invention to provide a magnetic head core of a generally ring shape formed from a plurality of ferrite core elements, which has substantially no rear gap, and to provide a method of producing such a core.

Another object of the invention is the provision of such a magnetic head core, which is formed with a narrow magnetic gap and provides for improved sensitivity and signal-to-noise ratio of the magnetic head, and a method of producing the core with such a narrow magnetic gap.

According to the present invention, there is provided a magnetic head core of a generally ring-shaped or toric cross sectional structure having a coil-winding aperture for winding coils, and forming a generally annular magnetic circuit, wherein a magnetic gap of a predetermined width is formed transversely across the annulus of the magnetic circuit, characterized in that the magnetic circuit consists of a plurality of core elements of ferrite which are assembled together into a generally ring-shaped assembly; and that one of the plurality of pairs of opposed surfaces of said plurality of core elements define said magnetic gap, the opposed surfaces of each remaining pair abutting on each other and being directly bonded together by means of a solid-solid reaction.

In the magnetic head core constructed according to the invention as described above, the mutually abutting surfaces or portions of the plurality of ferrite core elements are directly bonded together into an integral ring-shaped assembly, through a solid-solid reaction or a solid phase reaction of the ferrite material, rather than by using a bonding glass or other agent as practiced in the prior art. Since the magnetic circuit constituted by the thus bonded plurality of ferrite core elements has no hetero-phase between the core elements, there exists substantially no rear gap or back gap between the bonded core elements, and accordingly the magnetic circuit is made to be substantially free from magnetic resistance due to the existence of a rear gap or back gap, which is inevitable in the conventional ferrite cores. Thus, the present invention provides an effective measure to improve the sensitivity and S/N ratio of the magnetic head.

It will be obvious that the use of two or more ferrite core elements according to the invention to constitute an integral core assembly permits easy formation of a magnetic gap with a desired width between the opposed core elements. This means that the magnetic gap is easily formed with a relatively small width, ranging from 0.4 microns, to 3 microns approximately The cores with such a small magnetic gap width are suitably usable for magnetic heads for VTR and computer applications.

According to the invention, there is also provided a method of producing a magnetic head core of a generally ring-shaped structure consisting of a pair of core elements of ferrite which have opposed surfaces defining a magnetic gap, comprising the steps of: (a) subjecting at least one of the ferrite core elements to one of a grinding process and a chemical treatment process, to remove stock from the element to a predetermined depth to form one of said opposed surfaces defining the magnetic gap; (b) forming a groove in at least one of the ferrite core elements, the groove serving to define an aperture for facilitating a process of winding coils around the core elements; (c) subsequently to the above steps, butting the pair of core elements such that the groove is located internally in the butted core elements so as to form the aperture between the core elements, and such that said opposed surfaces of the core elements define the magnetic gap; and (d) heating the pair of ferrite core elements to bond abutting surfaces thereof together by means of a solid-solid reaction, thereby obtaining an integral ring-shaped assembly.

In accordance with the above method of the invention, the magnetic head core of the invention, which has the aforementioned features and advantages, is manufactured easily and economically.

In a particularly advantageous embodiment of the method of the invention, the pair of core elements consist of a pair of elongate blocks of ferrite, and a surface of at least one of the elongate blocks is subjected to said stock removing step and/or said groove forming step, along the length of the blocks, the elongage blocks being butted and bonded together into an elongate bonded assembly, which is then cut in parallel planes perpendicular to said length of the blocks. In this instance, several magnetic head cores of the same construction are produced from a single bonded assembly of the elongate core blocks. Accordingly, the production economy is significantly increased.

According to another advantageous embodiment of the instant method, one of the pair of ferrite core elements is formed with two protrusions located on opposite sides of said one of the opposed surfaces of the core elements which is subjected to the stock removing step. One of the two protrusions is located relatively adjacent to said one of the opposed surfaces, and the other protrusion is located relatively remote from said one of the opposed surfaces. The two protrusions of said one core element is butted on the other core element and bonded thereto so as to maintain a predetermined width of the magnetic gap betweeen the opposed surfaces. One end portion of the ring-shaped assembly including said one protrusion is cut off, whereby the two core elements are bonded together solely at said other protrusion to form a generally annular magnetic circuit.

The core elements used to form a ferrite core according to the invention are made of ferrite materials such as Mn-Zn ferrite and Ni-Zn ferrite, which are selected depending upon the specific applications of the ferrite core. As a rule, the plurality of core elements used in the invention are made of the same ferrite materials. Further, the crystal structure of ferrite of the core elements may be a single crystal or a polycrystal, or a composite of a single crystal and a polycrystal. It is possible that the core of the invention be made from ferrite core elements of mutually different crystal structures in combination.

BRIEF DESCRIPTION OF THE DRAWINGS

The foregoing and other objects, features and advantages of the present invention will be better understood from reading the following preferred embodiments taken in connection with, the accompanying drawings in which.

DETAILED DESCRIPTION OF THE PREFERRED EMBODIMENTS

Referring to FIGS. 2–10 of the accompanying drawings, several embodiments of a magnetic head core and a method for producing the same according to the invention will be described in detail.

Figure 2:
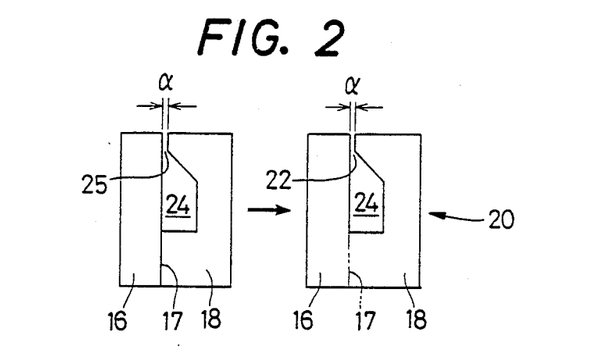
FIG. 2 is a view illustrating the process of assembling one embodiment of a magnetic head core of the invention, and the construction thereof.

There are first shown in FIG. 2 a pair of core elements 16, 18 of ferrite which are butted together at abutting surfaces 17, as shown on the left hand side of FIG. 2, so that a generally annular magnetic circuit is formed. The mutually abutting surfaces or portions 17 of the two ferrite core elements 16, 18 are bonded together through a solid-solid reaction, and a generally ring-shaped integral assembly 20 is obtained as a ferrite core of the invention, as depicted on the right hand side of the figure, wherein substantially no bonding boundary (17) (rear gap) is present between the bonded core elements 16, 18 at one end portion of the ferrite core 20. At the other or opposite end portion of the core 20, there is formed a magnetic gap 22 which is defined by opposed surfaces of the core elements 16, 18 at their ends corresponding to said other end of the core 20. The magnetic gap 22 is formed transversely across the annulus of the magnetic circuit of the core 20, and has a predetermined width which is the distance between the opposed surfaces of the core elements 16, 18. The core element 18 has a recess or groove and cooperates with the core element 16 to form a centrally located aperture 24, which facilitates a process of winding coils around the core elements 16, 18.

To form the magnetic gap 22, the core element 18 of the core 20 is subjected, before the two elements are butted together, to a chemical treatment process, e.g., chemical etching to remove stock to a depth corresponding to the width $\alpha$ of the magnetic gap 22. In this manner, the surface 25 is obtained. This surface 25 is indented from the bonding surfaces 17 by a distance of $\alpha$ and cooperates with the inner surface of the core element 16 to define the magnetic gap width $\alpha$. For improved smoothness and accuracy of the gap-defining surface 25, it is preferred that at least a portion of the core element 18 adjacent to the surface 25 consists of single crystals of ferrite. This is more so because the ferrite core elements 16, 18 are heated to an elevated sintering temperature to achieve bonding thereof at the abutting surfaces 17 through a solid-solid reaction so that the integral bonded assembly has substantially no rear gap at the bonding surfaces 17. Stated differently, when the portion of the core element 18 providing the gap-defining surface 25 is of a polycrystalline structure of ferrite, a so-called thermal etching phenonenon will take place, causing the grain boundary of the crystal to be concave. For assuring higher dimensional accuracy of the magnetic gap 22, therefore, it is recommended that at least the opposed portions of the core elements 16, 18, which define the gap 22, be formed of ferrite single crystal.

Figure 3:
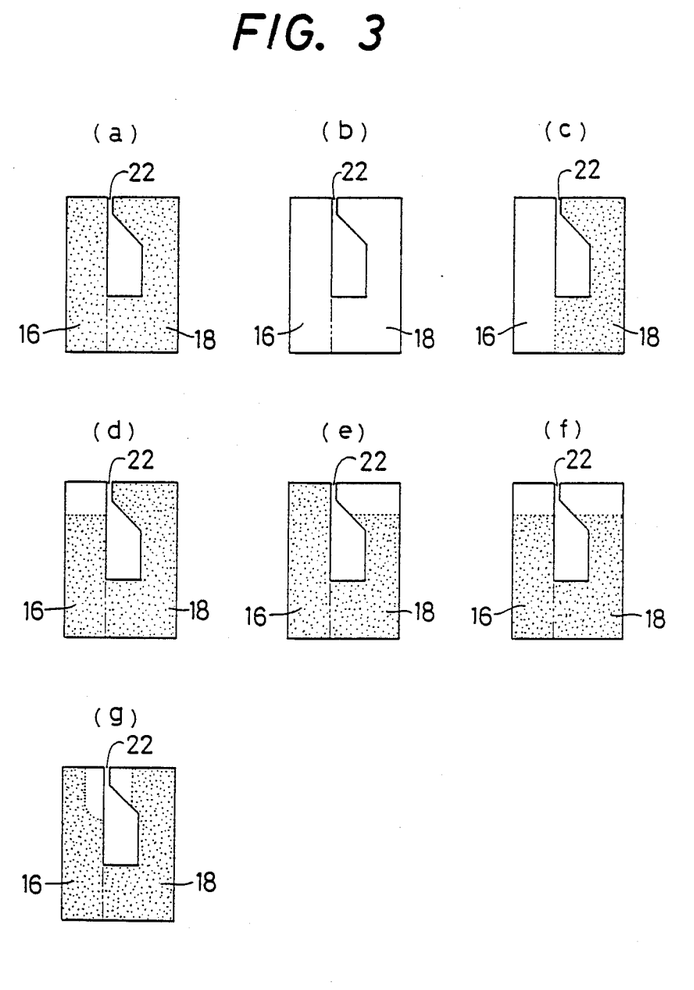
FIGS. 3(a) through 3(g) are front elevational views showing magnetic head cores made from core elements of ferrite of different crystal structures used according to the invention.

FIG. 3 exemplifies at (a) through (g) various magnetic head cores consisting of different combinations of core elements 16, 18 which have different crystal structures of ferrite. An example of FIG. 3(a) is a combination of the core elements 16, 18 both being made of ferrite polycrystal. A combination of FIG. 3(b) consists of the core elements both of a ferrite single crystal. The core element 16 of FIG. 3(c) is wholly ferrite single crystal, while the core element 18 is wholly ferrite polycrystal. In FIGS. 3(d) and (e), one of the ferrite core elements 16, 18 is wholly polycrystalline, but the other core element 16 or 18 is a composite of a single crystal portion and polycrystal portion, that is, only the portion adjacent to the magnetic gap 22 and having the surfaces over which a recording medium is slidably moved, is of single crystal structure. An example of FIG. 3 (f) is a combination of polycrystal-single crystal composites 16, 18, wherein only the portions having the gap-defining surfaces and recording-medium contacting surfaces are a ferrite single crystal. While an example of FIG. 3 (g) is also a combination of polycrystal-single crystal composites 16, 18, the single crystal portions are limited to those parts which contribute to defining the magnetic gap 22 and their vicinities. According to the invention, the combinations (a) through (g), more particularly (b), (f) and (g) are recommended as the core elements 16, 18 to form a magnetic head core of the invention.

Figure 4:
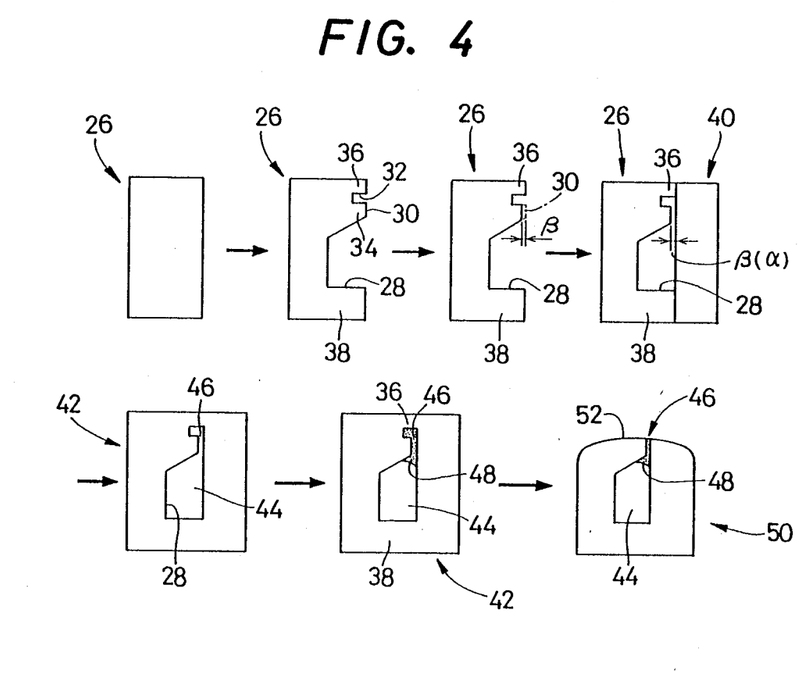
FIG. 4 shows the steps of producing another embodiment of a magnetic head core according to one embodiment of a method of the invention.

Referring next to FIG. 4, there are schematically shown steps of producing a further embodiment of a magnetic head core of the invention according to one preferred form of a method of the invention. A ferrite core element 26 (a block of ferrite) as one of two elements of the core is subjected to a process of forming a groove 28, which serves to define an aperture for easy winding of coils, as described later. Further, a partition groove 32 is cut adjacent to a gap-defining surface 30, so that a first protrusion 34, having the surface 30, is formed between the two grooves 28 and 32. Stated in more detail, the formation of the two grooves 28 and 32 on opposite sides of the first protrusion 34 (gap-defining surface 30) creates two outer protrusions, i.e., a second protrusion 36 which is relatively adjacent to the gap-defining surface 30, and a third protrusion 38 which is relatively remote from the gap-defining surface 30. While these grooves 28, 32 in the block of ferrite 26 are generally cut by using a diamond cutter or other suitable cutting tools, it is possible to form the grooves 28, 32 as a result of preparing a pre-formed ferrite block by using press-molding or a similar technique. In this specification, the preparation of the grooves 28, 32 is referred to as a groove forming step irrespective of the specific manner in which the grooves are formed, which manners include the aforementioned cutting of the grooves, and molding of a pre-formed block of ferrite 26 with the grooves.

Subsequently, the ferrite core element 26, with the grooves 28, 32, is subjected to a process of removing stock from the first protrusion 34 to a predetermined depth $\beta$. In other words, the height of the gap-defining surface 30 is reduced by a distance of $\beta$ relative to the top faces of the second and third protrusions 36, 38. This amount $\beta$ of stock removal is equivalent to the size (width) $\alpha$ of a magnetic air gap which will be described. For this reason, utmost care should be exercised in removing the stock from the protrusion 34. According to the invention, the stock removal is accomplished suitably by either one of grinding or a chemical treatment process, which are applied to the top face of the protrusion 34 to provide the gap-defining surface 30. Preferably, a chemical treatment, more specifically a chemical etching treatment is practiced, using hydrochloric acid, nitric acid, sulfuric acid, phosphoric acid or other inorganic acids, or mixtures or aqueous solutions thereof. However, the use of phosphoric acid is most preferred for improved straightness of the finished surface. In this connection, it is noted that the amount of etching (amount of stock removal) may be controlled by the concentration of acid used, etching time, temperature, and other factors. It is desired to stir the etching solution during the etching process.

When the stock removing process is achieved by chemical etching, it is desired that the core element 26 be made of ferrite single crystal, because the polycrystalline structure is not etched consistently due to difference in direction of crystal orientation and the etched surface tends to be rough. Further, even when the core element 26 is of a single crystal structure, it is preferred to select the type of crystal face. That is, the crystal face (110) tends to suffer from the generation of oblique line scratches as a result of etching. To avoid this defect, it is recommended to select symmetrical crystal faces, that is, the crystal face of the type (111) or (100). For the reasons stated above, it is particularly preferred that at least a portion of the core element 26, including the protrusion 34, consists of single crystals of ferrite with the crystal face (111) or (100).

As indicated previously, a grinding process may be used to remove the stock for the magnetic gap. The use of an ordinary blade such as a diamond blade does not usually permit sufficiently high accuracy of removing the stock exactly by a predetermined depth $\beta$, e.g., a few or several microns. According to the method of the invention, therefore, the grinding process is carried out by a rotary blade whose peripheral portion is made of a soft material such as rubber and polyurethane and contains abrasives of diamond. The blade containing the diamond abrasives is applied to the top surface of the protrusion 34 with a slight pressure exerted, such that the stock is removed at a low rate. Thus, the gap-defining surface 30 is obtained.

While the ferrite core element 26 is subjected to both groove forming and stock removing processes, and the groove forming step precedes the stock removing steps in the illustrated embodiment of FIG. 4, it is possible to perform the stock removing step prior to the groove forming step.

In the next step, another ferrite core element 40 is butted to the ferrite core element 26, which has been subjected to the groove forming and stock removing processes, such that the groove 28 is located between the two core elements 26, 40 or covered by the core element 40. In this condition, the outer, second and third protrusions 36, 38 of the core element 26 are held in abutting contact with the flat surface of the core element 40, and the gap-defining surface 30 and the opposite surface of the core element 40 defines a gap which has a width $\alpha$ equal to the previously indicated amount $\beta$ of stock removal from the first protrusion 34. This gap $\alpha$ serves as a magnetic air gap 46 which will be described.

In butting the two core elements 26, 40 together, it is desired to apply a ferrite-dissolving acid such as hydrochloric acid, nitric acid or sulfuric acid to the mutually abutting surfaces. Such an acid is applied for the purpose of forming salts of the ferrite component such as iron nitrate, manganese nitrate and zinc nitrate, which serve to secure the core elements 26, 40 relative to each other, and which is decomposed into oxides upon subsequent heat application. These oxides function to accelerate the solid-solid reaction or solid phase reaction of the core elements 26, 40, which results in the bonding of the two elements. In place of the above indicated acids, it is possible to use a solution of inorganic salt including a ferrite component, which solution produces almost the same effects and results as the acids, upon abutting bonding of the two core elements 26, 40.

The ferrite core elements 26, 40 thus butted together as indicated above, are then heated to cause a solid-solid reaction at the mutually abutting portions thereof, whereby the two elements 26, 40 are sintered and bonded together into an integral assembly 42 of a generally ring-shaped cross section. The integral assembly 42 of ferrite has a substantially continuous structure without a hetero-phase at the abutting portions of the core elements 26, 40, and is formed with a centrally located coil-winding aperture 44 which is partially defined by the groove 28 formed in the core element 26. Further, the ferrite assembly 42 is formed with the magnetic gap 46 having the width $\alpha$ ($\beta$) which is defined by the protrusion 34 (gap-defining surface 30) of the core element 26 and the opposite surface of the core element 40.

Since the sintering of the core elements 26, 40 through solid-solid reaction occurs at a temperature of about 1100° C., it is required that the mutually abutting portions of the elements be heated to 1100° C. or higher to obtain direct bonding of the abutting portions. In the case where the core elements are made of ferrite polycrystal, however, the heating of the elements to a relatively higher temperature will cause the previously described thermal etching phenomenon that leads to a roughening of the opposed surfaces of the elements which define the magnetic gap 46. Therefore, the sintering temperature should be kept relatively low, preferably not higher than 1250° C. When the portions of the core elements 26, 40 defining the magnetic gap 46 consist of ferrite single crystal, there is no such limitation in the sintering temperature. In this instance, however, a high sintering temperature (solid-solid reaction temperature) is desired for elimination of slight unevenness of the gap-defining surface produced by the previous stock removing process by chemical etching or mechanical grinding. Usually, such unevenness of the gap-defining surface is effectively eliminated when the sintering temperature is 1350° C., or higher.

Generally, the core elements 26, 40 in the mutually abutting condition are heated in a furnace. The atmosphere in the heating furnace is important to maintain the characteristics of the ferrite, and should be carefully selected, since the characteristics of the ferrite are considerably deteriorated through oxidation or reduction in the heating process. Consequently, it is important to use the atmosphere whose oxygen partial pressure is equal to that of the ferrite, i.e., equilibrated oxygen partial pressure. Whereas, the control of the oxygen partial pressure of the heating atmosphere is very difficult to achieve. The easiest method which is considered available is to heat the butted core elements 26, 40 in a heating box made of ceramics such as alumina. For adjusting the atmosphere within such a ceramic heating box in which the ferrite core elements 26, 40 are introduced, it is generally desired to introduce therein a dummy member in the form of powder or sheet of the same ferrite as the core elements.

After the core elements 24, 40 have been bonded together into the integral assembly 42 through a solid-solid reaction at an elevated temperature, the magnetic gap 46 is filled with a mass of glass 48 for protection of the portions adjacent to the magnetic gap 46. Usually, a suitable solid glass in the form of a rod or the like is located adjacent to the magnetic gap 46 and heated at 600°-900° C., so that the molten glass flows to fill the magnetic gap 46. As in the preceding heating process for solid-solid reaction, the filling of the gap 46 with the glass 48 should be performed in an atmosphere of equilibrated oxygen partial pressure. As the temperature for melting the solid glass is lower than the solid-solid reaction temperature, this glass filling process is generally conducted in a nitrogen ($N_2$) gas.

The assembly 42, with its magnetic gap 46 filled-in with the glass 48, is cut to remove its end portion including the partition groove 32 and the adjacent second protrusion 36, so that the outer end of the magnetic gap 46 is open, and so that the cut surface serves as the contact surface of the core over which a suitable recording medium, such as a magnetic tape, is slidably moved for well-known magnetic recording, reading or other operations. With this cutting of the end portion at the outer end of the gap 46, an intended ferrite core 50 of the invention, defining a generally annular magnetic circuit, is obtained, wherein the two core elements 26, 40 are bonded together only at the third protrusion 38. Coils are then wound around the core elements, by utilizing a space of the coil-winding aperture 44, and a magnetic head is produced.

Figure 5:
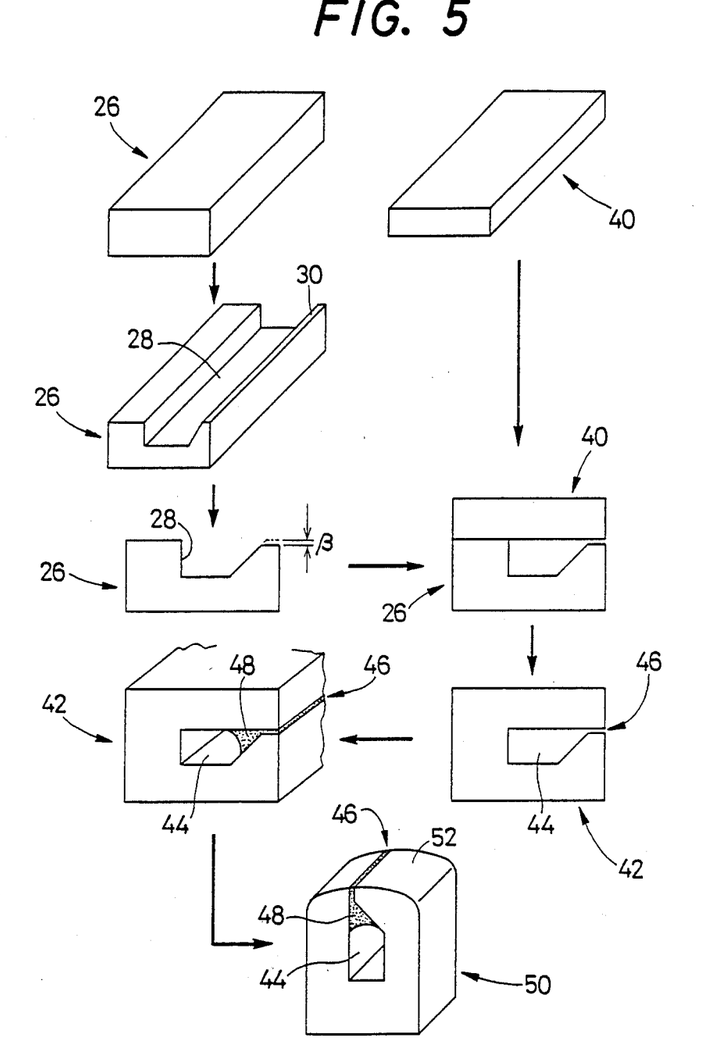
FIGS. 5–8 are views, similar to FIG. 4, showing further embodiments of the cores of the invention, which are manufactured according to different embodiments of the method of the invention.

While the steps of production according to one form of the method of the invention have been described referring to a specific example of FIG. 4, wherein a single ferrite core is produced from the core elements 26, 40, it is appreciated to use a pair of elongate blocks of ferrite as shown in FIG. 5, for producing a plurality of ferrite cores from a bonded assembly of these two elongate ferrite blocks by cutting the completed assembly into individual cores of suitable dimensions.

Stated more specifically with reference to FIG. 5, the pair of elongate rectangular blocks of ferrite 26, 40 are used as the starting materials. The block 26 is subjected to the previously discussed groove forming and stock removing processes, to form a groove 28 and remove stock by a predetermined depth $\beta$ from a gap-defining surface 30. The other ferrite block 40 is then placed on the processed ferrite block 26 in a mutually abutting relationship, and heated for sintering and integral bonding through a solid-solid reaction at the abutting portions, whereby an elongate bonded assembly or core block 42 is prepared, with a magnetic air gap 46 formed between the two blocks 26, 40. After the magnetic gap 46 is filled-in with the glass 48, the elongate assembly 42 is cut in parallel planes perpendicular to its length at suitable intervals, whereby a plurality of ferrite cores 50 of the same size are obtained. Prior to this cutting process, the assembly 42 is subjected to a suitable process for forming a contact surface 52 with which a recording medium is brought into sliding contact.

Figure 6:
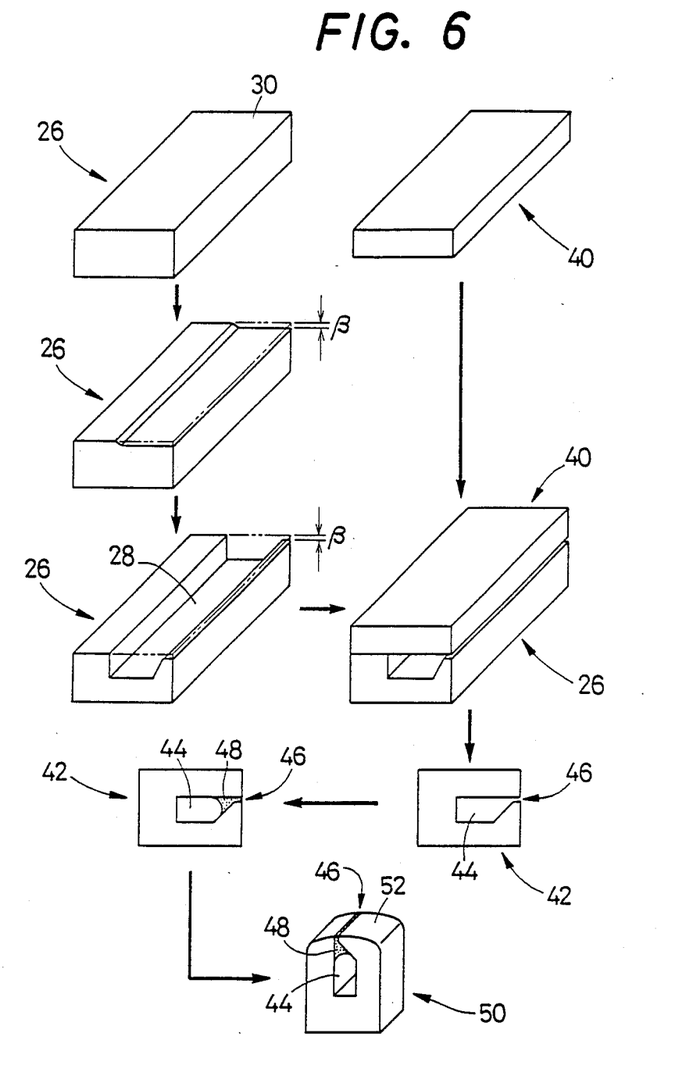

Another example is shown in FIG. 6, which is different from the example of FIG. 5, in that the elongate ferrite block 26 is subjected to a stock removing process prior to a groove forming process. That is, the surface 30 of the block 26 is first ground or etched to remove a predetermined amount of stock (to a depth $\beta$) in an area including a portion which serves to define a magnetic air gap. Subsequently, the groove 28 is formed in the surface 30. As is apparent from the examples of FIGS. 5 and 6, the order in which the groove forming and stock removing steps are conducted is not fixed, that is, the grooving step may occur prior to the stock removing step or vice versa. In the example of FIG. 6, the butted core elements 26, 40 are bonded together in the same manner as previously described in connection with the example of FIG. 5.

Figure 7:
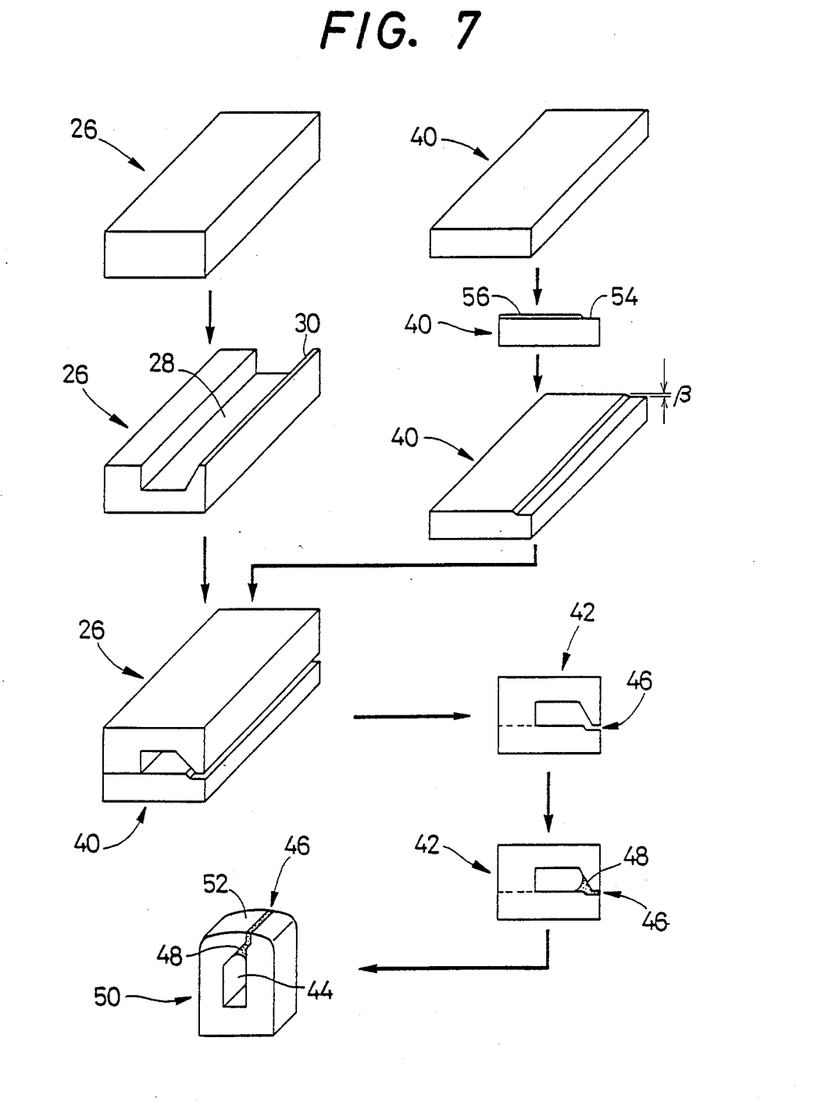

While only one of the ferrite core elements (26) is subjected to the grooving and stock removing steps in the example of FIG. 6, it is possible to apply these steps to both of the core elements 26, 40, or to apply one of the steps to one of the core elements and apply the other step to the other core element. An example of the latter case is illustrated in FIG. 7.

In this example, the core element 26 is subjected to a grooving process only. That is, the groove 28 for a coil-winding aperture is formed, on one surface of the core element 26. Additionally, one surface of the other core element 40 is coated with a suitable chemically resistant film 56, except an area corresponding to a gap-defining portion 54, and subjected to a chemical etching process (stock removing step), whereby a predetermined thickness $\beta$ of stock is removed from the uncoated portion to form the gap-defining surface. In the next step, the thus processed two core elements 26, 40 are butted together as shown, and heated for a solid-solid reaction to occur at the abutting portions. Thus, an integrally bonded elongate assembly (core block) 42 is obtained. In this assembly 42, the magnetic gap 46 is defined by the opposed surfaces of the elements 26, 40, i.e., a gap-defining surface 30 of the element 26 extending along the groove 28, and the gap-defining surface 54 which was prepared by chemical etching. Obviously, the width of the gap 46 is equal to the depth $\beta$ of stock removed. The elongate assembly 42 is then subjected to the processes for filling the gap 46 with glass and forming a contacting surface 52 for sliding contact with a recording medium. After completion of these steps, the assembly 42 is cut across its length at predetermined intervals along the length, to obtain a plurality of ferrite cores 50 of the same dimensions.

Figure 8:
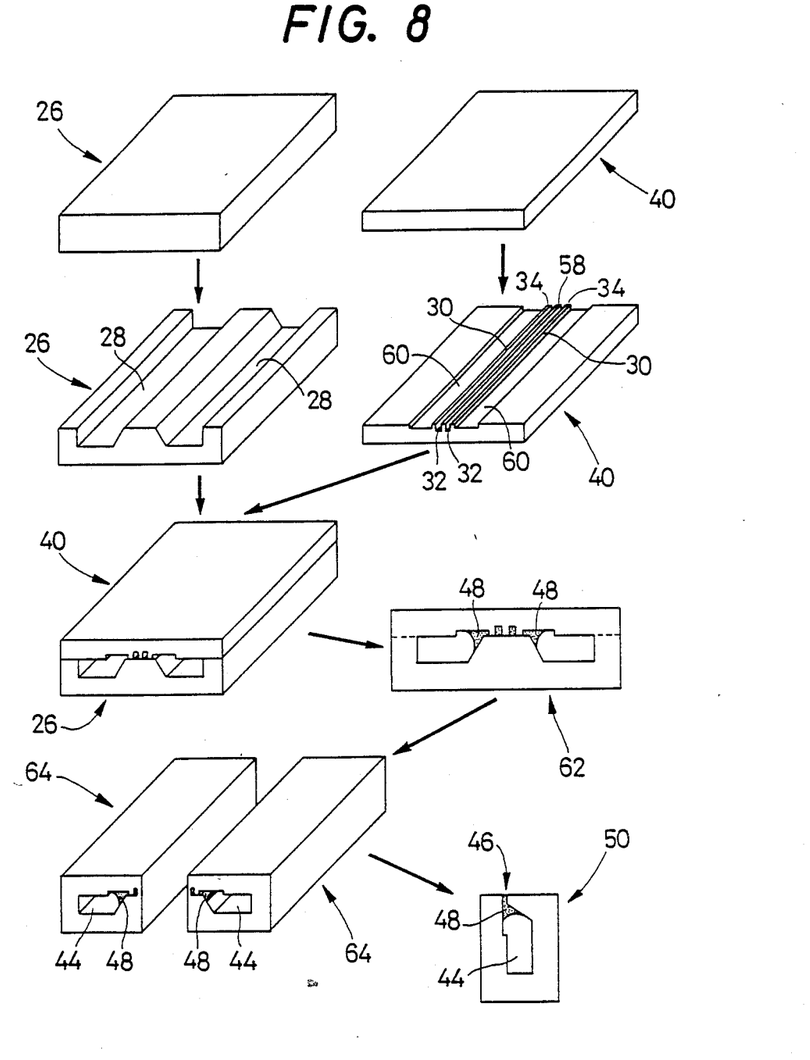

Referring further to FIG. 8, there is shown another modified example wherein the core elements 26, 40 are rectangular plates having a relatively large width so that a bonded assembly of these plates provides two elongate core blocks by cutting the bonded assembly along its length in the middle of its width. In this example, two grooves 28 for coil-winding apertures are formed in parallel in one of the core element plates 26, so that the grooves 28 are symmetrical with each other with respect to an axial centerline along which the plate 26 is subsequently cut. In the other core element plate 40, there are formed two partition grooves 32 to form a central protrusion 58 therebetween, and two auxiliary recesses 60 which are located outside and extend parallel to the partition grooves 32. The auxiliary recesses 60 and the partition grooves 32 cooperate to define therebetween two parallel protrusions 34 whose top lands are ground or chemically etched to a depth $\beta$, to provide gap-defining surfaces 30.

Figure 9:
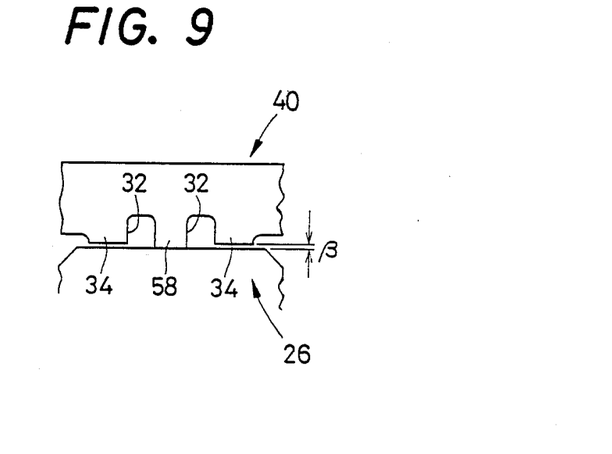
FIG. 9 is a fragmentary enlarged view showing parts of two ferrite core elements of FIG. 8.

The two core elements plates 26, 40 are then butted together as shown in FIG. 8, such that the top surface of the central protrusion 58 of the core element plate 40 abuts on the surface of the other core element plate 26 as shown in enlargement in FIG. 9. In this condition, magnetic air gaps equal to the grinding or etching depth $\beta$ are formed between the surface of the plate 26 and the top surfaces of the protrusions 34 adjacent to the partition grooves 32. The abutting assembly of the two core element plates 26, 40 is then heated for a solid-solid reaction bonding at the abutting portions, as previously discussed. Thus, a bonded assembly 62 having a relatively large width is obtained. After the magnetic gaps have been filed with glass 48, the assembly 62 is split by cutting along the central protrusion 58, thereby providing two elongate core blocks 64, 64 similar in cross sectional shape to the assembly 42 of FIG. 4. Subsequently, these two core blocks 64 are cut across their length at desired intervals along the length, whereby a plurality of ferrite cores 50 according to the invention are produced.

While the present invention has been described hitherto in its several preferred embodiments, it is to be understood that the invention is not limited thereto; but various changes, modifications and improvements may occur to those skilled in the art without departing from the spirit and scope of the invention.

Figure 10:
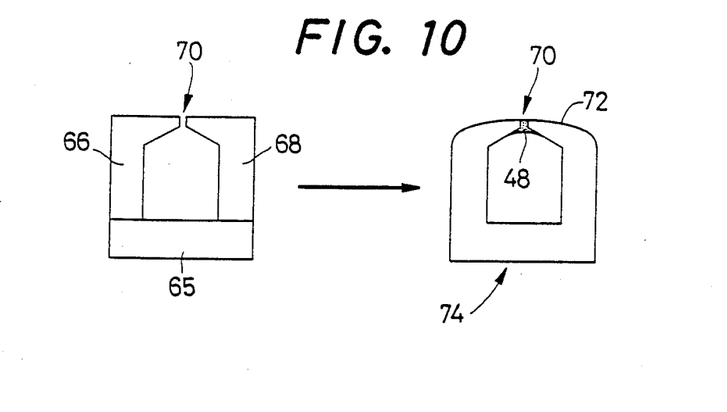
FIG. 10 is a view corresponding to FIG. 2, representing a still further embodiment of the invention.

For example, while all of the illustrated embodiments use two core elements to constitute a magnetic head core of a generally ring-shaped cross section (annular magnetic circuit), it will be appreciated to use three core elements 65, 66 and 68, as depicted in FIG. 10. A magnetic head core of the invention may be constituted, according to the invention, by more than three core elements. In the modified example of FIG. 10, a magnetic gap 70 is defined by opposed surfaces of the two opposed core elements 66 and 68, which are both bonded integrally to the core element 65 through a solid-solid reaction according to the invention. The gap 70 is filled-in with glass 48, and a contact surface 72 is formed. Thus, a ferrite core 74 of the invention is produced.

As described hitherto, the instant method uses a combination of two or more core elements of ferrite to constitute a ferrite core of the invention which has a generally annular or toroidal magnetic circuit. Since a magnetic air gap is formed by opposed surfaces of the two separate core elements which are bonded together, the gap can be formed with a very small width, which is the distance between the two opposed core elements. Accordingly, the core of the invention is suitably applicable for magnetic heads for video tape recorders and computers, which require the head core to have a magnetic air gap as small as 0.4 to 3 microns. According to the method of the invention, the core can be formed with such a small magnetic gap. Another important advantage of the invention resides in the manner of bonding the core elements through a solid-solid reaction at the abutting portions of the elements. This solid-solid reaction bonding substantially eliminates otherwise possible presence of a gap at the abutting and bonding surfaces, i.e., a rear gap located remote from the magnetic gap at the front end of the core. The elimination of the rear gap results in a decrease in magnetic resistance of the core, which in turn contributes to improvement in the sensitivity and S/N ratio of the magnetic head.

The invention is further illustrated by the following Examples. These examples should not be construed to limit the scope of the invention.

EXAMPLE 1

According to the method illustrated in FIG. 5, the coil-winding groove 28 was formed in one (26) of the two elongate core elements 26, 40 which had been pre-polished for smooth abutting surfaces. The core element 26 was coated with a suitable chemically resistant film, except an area corresponding to the gap-defining surface 30. The core element 26 was then immersed for 90 minutes in a conc. solution of phosphoric acid at 50° C. As a result, the gap-defining surface 30 was etched by a depth of 2 $\mu$m ($\beta$).

Subsequently, the processed core element 26 and the other core element 40 were butted together after a solution of nitric acid had been applied to the abutting surfaces. Successively, the core elements 26, 40 were dried and introduced into a furnace, and heated at 1200° C. for one hour in an atmosphere having an equilibrated oxygen partial pressure, so as to cause a solid-solid reaction at the abutting surfaces of the core elements 26, 40. Thus, the two core elements were sintered and bonded together into an integral assembly 42. A rod of glass 48 was melted to fill-in the magnetic gap 46, and the assembly 42 was finally cut in parallel planes perpendicular to its length, which planes are evenly spaced apart from each other along the length of the assembly. Thus, a plurality of magnetic head cores 50 were obtained.

The observation of the obtained core 50 revealed complete absence of a boundary interface at the abutting surfaces of the two core elements 26, 40 which were integrally bonded together through a solid-solid reaction. The measurement of the width of the magnetic gap 46 was 2 $\mu$m. A magnetic head using this core 50 was compared, in S/N ratio, with a magnetic head using a known core constituted by glass-bonded core elements. The magnetic head with the instant core 50 demonstrated 2 dB improvement in the S/N ratio over the known head. It was found that the instant core 50 had a significantly reduced magnetic resistance at the abutting portions of the two elements 26, 40, due to absence of a "rear gap" which would exist at such abutting portions in the known glass-bonded core.

EXAMPLE 2

The magnetic head core was prepared according to the method illustrated in FIG. 6. As in Example 1, the pair of elongate core elements 26, 40 used in this example were pre-polished to form smooth abutting surfaces. As shown in the figure, the surface 30 of the core element 26 was ground to 1 $\mu$m depth with a rotary blade made of comparatively fine foamed urethane, which contains abrasives of diamond in its peripheral portion. Subsequently, the coil-winding groove 28 was formed in the core element 26.

The processed core element 26, and the other core element 40, were then butted together into a contacting engagement as shown, with a hydrochloric acid solution being applied to the abutting surfaces. After the elements 26, 40 had been dried, the assembly was placed in an alumina box, which was then introduced into a heating furnace. The core elements 26, 40 were heated at 1350° C. for one hour in a nitrogen gas of 10% oxygen concentration, whereby the abutting portions of the elements were sintered and integrally bonded together.

The magnetic gap 46 was filled-in with the molten glass 48, and the obtained assembly 46 was cut into a plurality of cores 50 according to the invention.

Observation of the obtained core 50 revealed complete absence of a boundary interface at the abutting surfaces of the two core elements 26, 40, which were integrally bonded through a solid-solid reaction. The measurement of the width of the magnetic gap 46 was 1 $\mu$m. A magnetic head prepared by winding coils around this core 50 was compared, in S/N ratio, with a magnetic head using a known core constituted by glass-bonded core elements. The magnetic head with the instant core 50 demonstrated 2 dB improvement in the S/N ratio over the known head. It was found that the instant core 50 had a significantly reduced magnetic resistance at the abutting portions of the two elements 26, 40, as in Example 1.

What is claimed is:

1. A method of producing a magnetic head core of a generally ring-shaped structure including a pair of core elements of ferrite which include opposed surfaces defining a magnetic gap, comprising the steps of:

preparing said pair of core elements of ferrite such that each includes at least one surface, which surfaces ultimately abut each other, and such that at least a portion of at least one of the ferrite core elements which assists in defining the magnetic gap is made of a ferrite single crystal;

subjecting at least said portion of said at least one of said ferrite core elements to a chemical etching process, to remove material therefrom to a predetermined depth to form at least one of said opposed surfaces defining said magnetic gap;

forming a groove in at least one of said ferrite core elements, said groove serving to define an aperture for facilitating a process of winding coils around said core elements;

treating the surfaces of the pair of core elements which ultimately abut each other with at least one solution selected from the group consisting of ferrite-dissolving acid and inorganic salt including a ferrite component;

butting said pair of core elements together after the above steps, such that said groove is located internally in the butted core elements so as to form said aperture between the core elements, and such that said opposed surfaces define said magnetic gap; and heating said pair of ferrite core elements to directly bond abutting surfaces thereof together by means of a solid-solid reaction, thereby obtaining an integral ring-shaped assembly.

2. The method of claim 1, wherein said pair of core elements comprises a pair of elongate blocks of ferrite, a surface of at least one of said elongate blocks being subjected to at least one of the material removing step and the groove forming step, along the length of the block, said elongate blocks being butted into contacting engagement and thereafter bonded together into an elongate bonded assembly, said elongate bonded assembly being cut in parallel planes perpendicular to said length of the blocks, whereby a plurality of ring-shaped assemblies are obtained.

3. The method of claim 1, wherein one of said pair of core elements is formed with at least two protrusions located on opposite sides of one of said opposed surfaces subjected to the material removing step, one of said at least two protrusions being located relatively adjacent to said one of the opposed surfaces, and a second of said at least two protrusions being located relatively remote from said one of the opposed surfaces, each of said at least two protrusions of said one core element being butted onto the other core element in a contacting engagement and being bonded thereto so as to maintain a predetermined width of said magnetic gap between said opposed surfaces, and wherein one end portion of said ring-shaped assembly including one of said at least two protrusions is cut-off, whereby the two core elements are bonded together only at one of said at least two protrusions to form a generally annular magnetic circuit.

4. The method of claim 1, wherein said portion made of ferrite single crystal has a crystal plane selected from the group of crystal planes consisting of (111) and (100).

5. The method of claim 1, wherein said ferrite-dissolving acid comprises at least one acid selected from the group consisting of hydrochloric acid, nitric acid, and sulfuric acid.

6. The method of claim 1, wherein said inorganic salt including a ferrite component comprises at least one salt selected from the group consisting of iron nitrate, manganese nitrate, and zinc nitrate.

* * * * *